(12) United States Patent
Ishidate et al.

(10) Patent No.: US 9,195,063 B2
(45) Date of Patent: Nov. 24, 2015

(54) LIGHT SCANNING APPARATUS AND IMAGE FORMING APPARATUS

(71) Applicant: CANON KABUSHIKI KAISHA, Tokyo (JP)

(72) Inventors: Takehiro Ishidate, Tokyo (JP); Yasuaki Otoguro, Abiko (JP); Juichi Kawano, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/310,945

(22) Filed: Jun. 20, 2014

(65) Prior Publication Data
US 2015/0002594 A1    Jan. 1, 2015

(30) Foreign Application Priority Data
Jun. 26, 2013 (JP) .................................. 2013-134042

(51) Int. Cl.
*G02B 26/12* (2006.01)
*G03G 15/04* (2006.01)

(52) U.S. Cl.
CPC .......... *G02B 26/125* (2013.01); *G03G 15/0409* (2013.01); *G03G 15/04072* (2013.01)

(58) Field of Classification Search
CPC . G02B 26/125; B41J 2/385; G03G 15/04054; G03G 15/043; G03G 15/0409
USPC .......................................... 347/263, 224, 257
See application file for complete search history.

(56) References Cited

U.S. PATENT DOCUMENTS

| | | | |
|---|---|---|---|
| 7,453,487 B2 * | 11/2008 | Sato et al. ...................... | 347/257 |
| 7,522,326 B1 | 4/2009 | Otoguro ........................ | 359/216 |
| 7,684,099 B2 | 3/2010 | Otoguro ...................... | 359/216.1 |

FOREIGN PATENT DOCUMENTS

| | | |
|---|---|---|
| JP | 2001-154082 | 6/2001 |
| JP | 2002-311369 | 10/2002 |
| JP | 2010-237537 | 10/2010 |

OTHER PUBLICATIONS

U.S. Appl. No. 14/201,414, filed Mar. 7, 2014.
U.S. Appl. No. 14/325,029, filed Jul. 7, 2014.

* cited by examiner

*Primary Examiner* — Sarah Al Hashimi
(74) *Attorney, Agent, or Firm* — Fitzpatrick, Cella, Harper & Scinto

(57) ABSTRACT

A light scanning apparatus, including: a light source; a deflector configured to deflect the light beam from the light source to scan a photosensitive member; an optical member configured to guide the light beam; a housing including a housing engaging portion and a supporting portion configured to support the optical member; a leaf spring including a pressing portion and a leaf spring engaging portion; and an abutment portion, wherein, in a process in which the housing engaging portion and the leaf spring engaging portion are moved from a second state in which the leaf spring engaging portion is not engaged with the housing engaging portion to a first state in which the leaf spring engaging portion is engaged with the housing engaging portion, the pressing portion is moved from the abutment portion to the optical member.

9 Claims, 9 Drawing Sheets

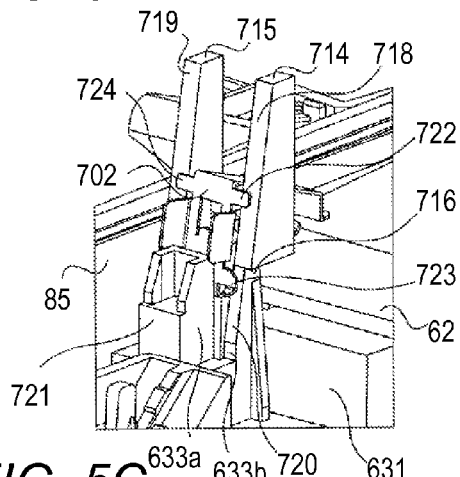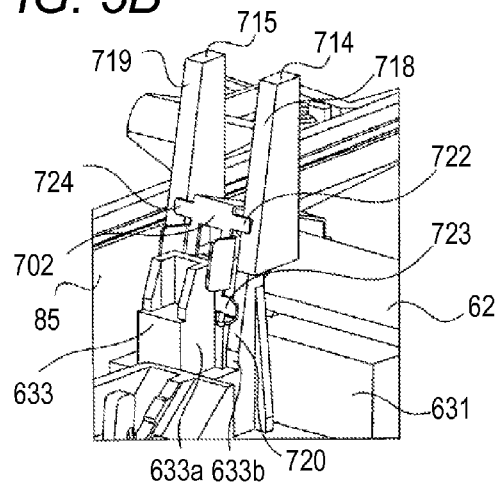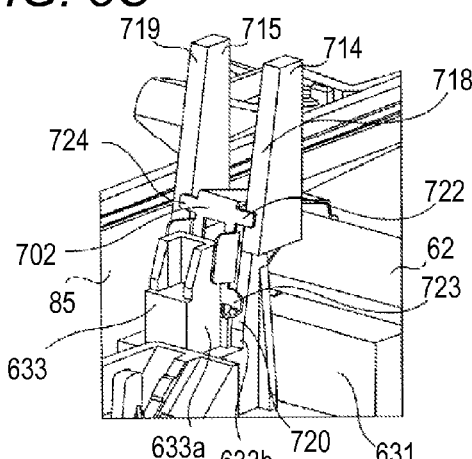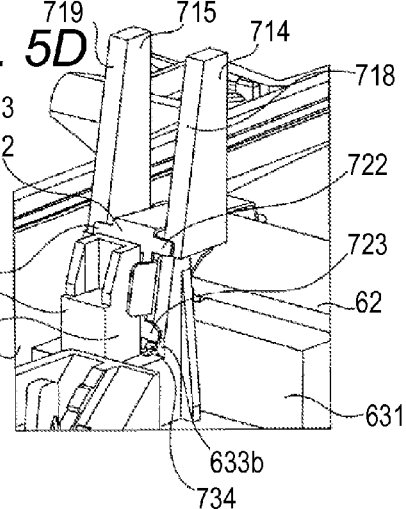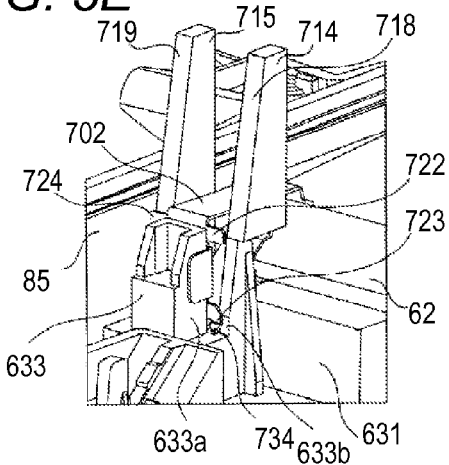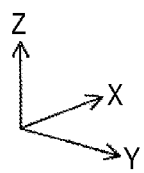

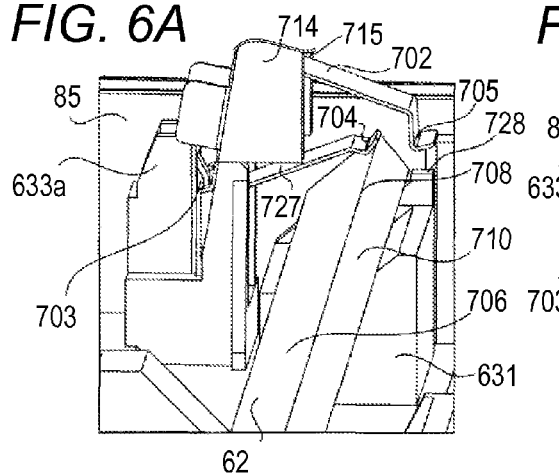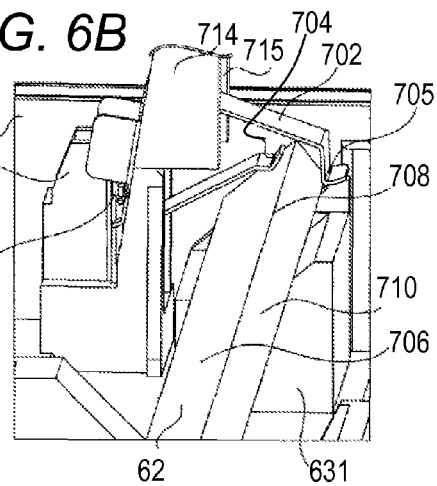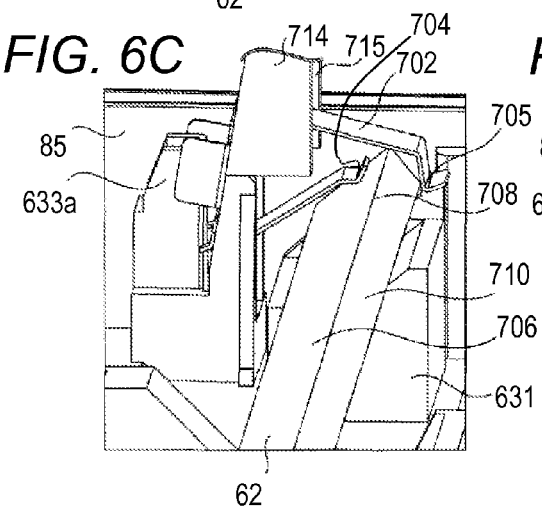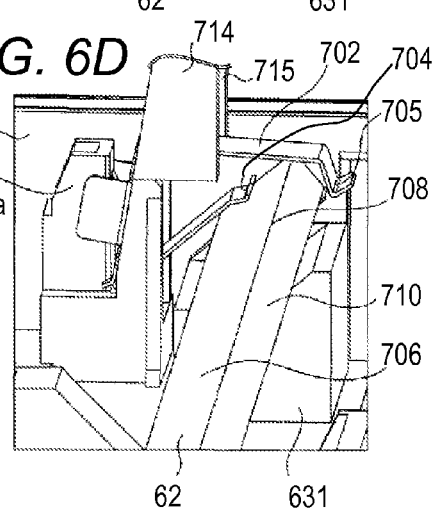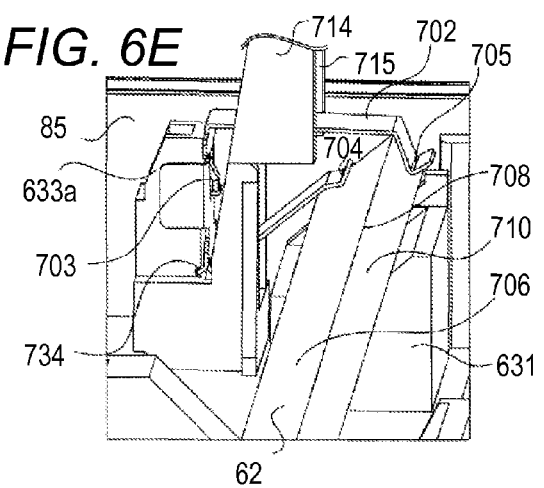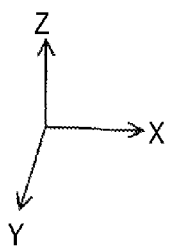

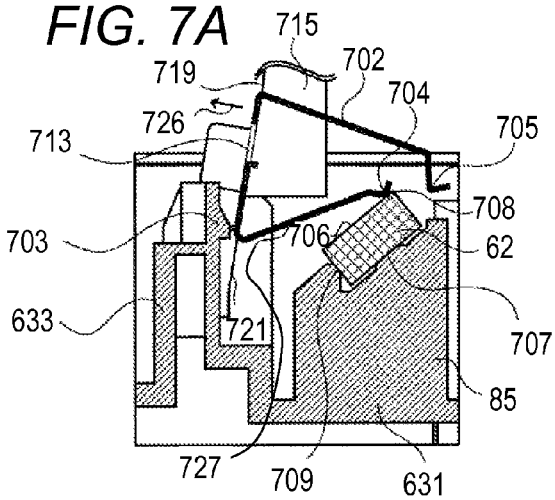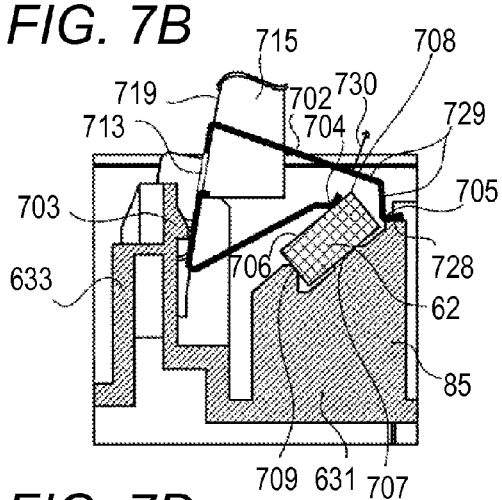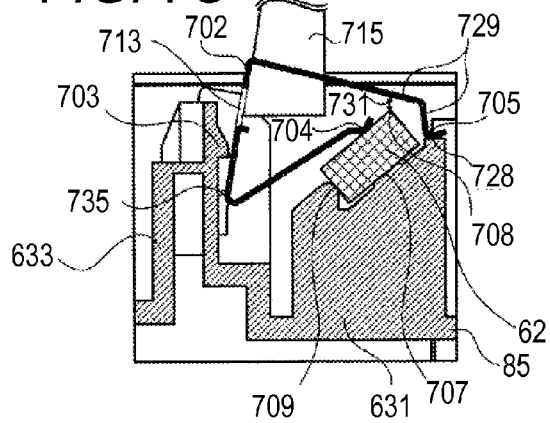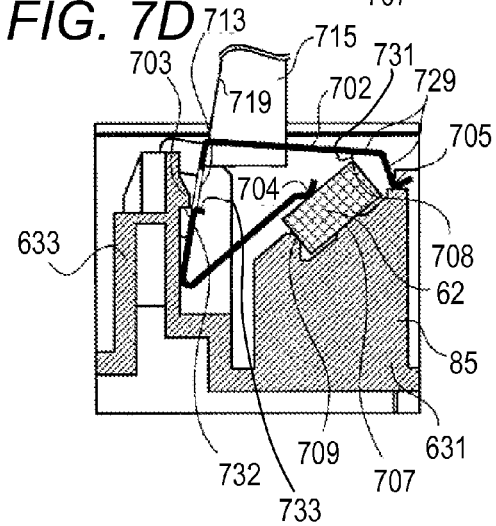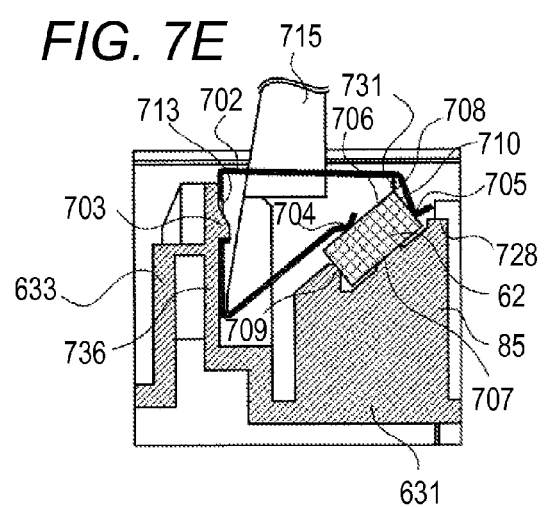

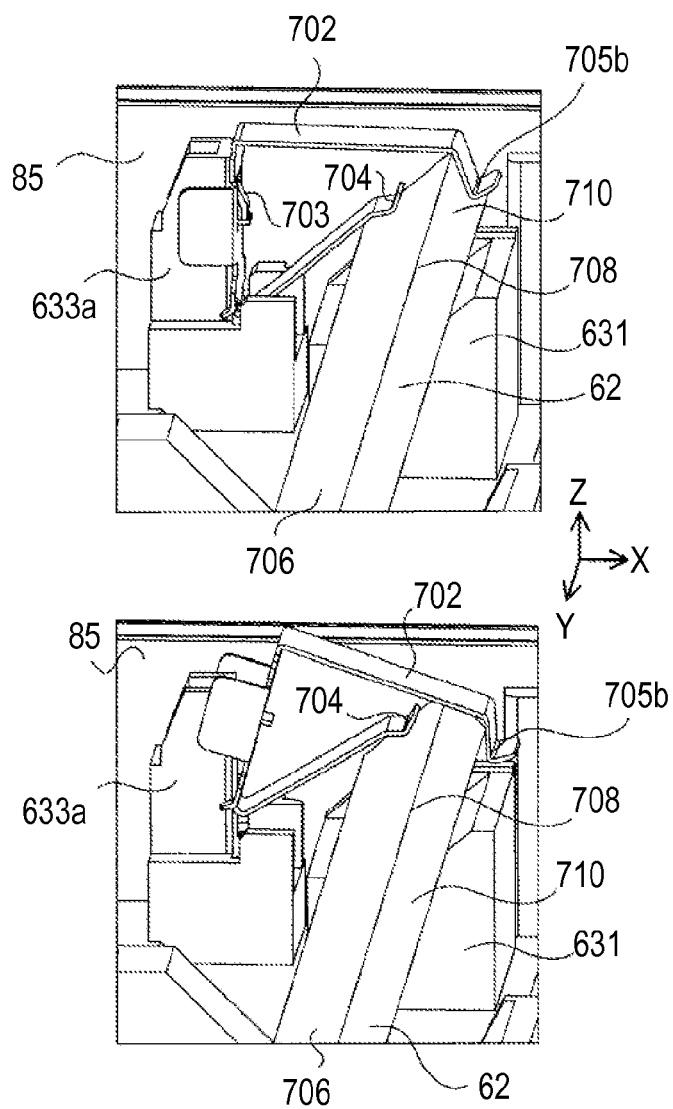
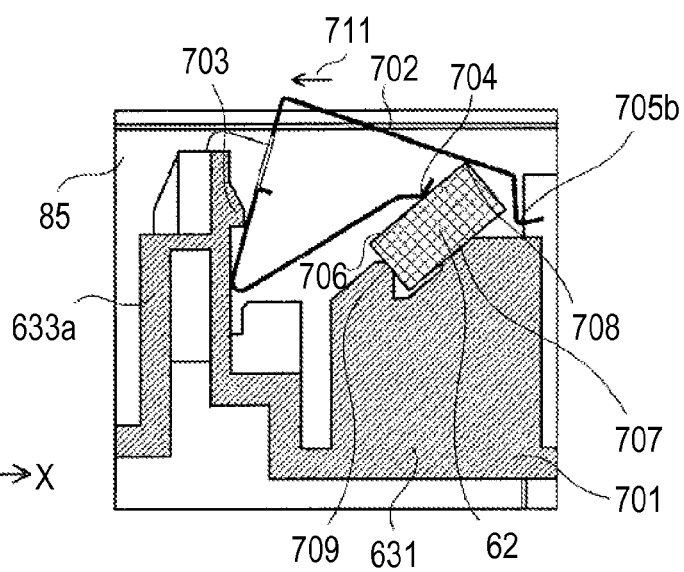
FIG. 9A
FIG. 9B
FIG. 9C

LIGHT SCANNING APPARATUS AND IMAGE FORMING APPARATUS

BACKGROUND OF THE INVENTION

1. Field of the Invention

The present invention relates to a light scanning apparatus, and an image forming apparatus including the light scanning apparatus.

2. Description of the Related Art

Hitherto, an electrophotographic image forming apparatus includes a light scanning apparatus configured to scan a uniformly charged surface of a photosensitive member (hereinafter referred to as a "photosensitive drum" for convenience) with a light beam modulated in accordance with image information, to form a latent image on the surface of the photosensitive drum. The latent image formed on the photosensitive drum is developed into a toner image with developer (toner). Then, the toner image on the photosensitive drum is transferred and fixed to a recording medium. In this manner, an image is formed on the recording medium.

The light scanning apparatus includes a semiconductor laser (light source), a rotary polygon mirror (deflection member) configured to deflect a light beam emitted from the semiconductor laser, and a motor (drive device) configured to rotate the rotary polygon mirror. The light scanning apparatus further includes optical components such as an fθ lens (imaging optical member) configured to image the light beam onto a surface to be scanned, and a reflecting mirror (turning mirror) configured to change a direction of the light beam toward the surface to be scanned. In general, those components are arranged in a housing referred to as an optical box with high accuracy. FIG. 8A is a schematic structural view illustrating a generally-used optical component holding structure, and FIG. 8B is a cross-sectional view passing through a center portion of a leaf spring. A reflecting mirror 62 serving as an optical component is held and fixed to a housing 85 due to a pressurizing force of a leaf spring 702 serving as a pressing member. From the viewpoint of installation space saving and workability, the leaf spring 702 is put on an engaging portion 703 formed in the housing 85 instead of being fixed by screws. In the vicinity of the engaging portion 703, the housing 85 receives a part of a reaction force generated when the optical component is pressed, and thus the leaf spring 702 maintains a predetermined position. As illustrated in FIG. 8B, the leaf spring 702 includes a first pressing portion 704 and a second pressing portion 705a. The first pressing portion 704 pressurizes a mirror reflection surface 706 toward a first mirror seating surface 707 provided on the housing 85. On the other hand, the second pressing portion 705a pressurizes a mirror edge portion 708 in a direction of being pressed toward the first mirror seating surface 707 and a second mirror seating surface 709. The reflecting mirror 62 is pressed in two directions by the first pressing portion 704 and the second pressing portion 705a, thereby improving vibration isolating performance of the reflecting mirror 62, and also preventing the reflecting mirror 62 from dropping off when an impact such as a drop impact or vibration is exerted on the reflecting mirror 62.

However, there are the following problems with this structure. That is, the second pressing portion 705a presses the mirror edge portion 708 of the reflecting mirror 62, which is low in strength, and hence shaving, chipping, cracking, and the like may occur in the mirror edge portion 708. In particular, as the optical components such as the reflecting mirror 62 and the lens, there are many products made of a glass material, and in this case, the shaving, chipping, cracking, and the like are liable to occur in the mirror edge portion 708 due to slight contact with other components or the like. When the second pressing portion 705a is brought into contact with the mirror edge portion 708 and powders and fine fragments generated along with the shaving, chipping, cracking, and the like adhere to the mirror, the reflectance of the mirror is degraded, with the result that the light intensity of the light beam to be guided onto the photosensitive drum becomes lower than a desired design light intensity.

As measures to prevent the shaving, chipping, and cracking of the reflecting mirror 62 due to the leaf spring 702, the following structure is proposed. For example, in Japanese Patent Application Laid-Open No. 2010-237537, there is proposed a structure in which a gripping portion configured to grip the leaf spring is provided and deflected by an assembly jig, to insert the reflecting mirror pressing portion to a predetermined position while compressing the pressing portion. In this structure, the assembly jig receives a reaction force generated when the gripping portion is deflected, and thus the leaf spring can be attached without applying a force (hereinafter referred to also as a "stress") that may cause the shaving, chipping, and cracking in the mirror edge portion of the reflecting mirror. Further, a structure illustrated in FIG. 9A is proposed as a structure configured to prevent the leaf spring from being brought into contact with the mirror edge portion of the reflecting mirror when the leaf spring is attached to a predetermined position. In the structure of FIG. 9A, the portion to be pressed by a second pressing portion 705b corresponding to the second pressing portion 705a of FIG. 8B is changed from the mirror edge portion 708 to a mirror flat surface 710. Note that, elements designated by the other references symbols of FIGS. 8A, 8B, 9A, 9B, and 9C will be described in embodiments of the present invention described later.

In the case of the structure illustrated in FIG. 9A, the stress exerted on the mirror edge portion 708 of the reflecting mirror 62 in the state in which the leaf spring 702 is attached is reduced as compared to that of FIG. 8A. When the leaf spring 702 is to be engaged with the engaging portion 703 of the housing 85, however, the leaf spring 702 moves in contact with the mirror edge portion 708, and hence the shaving, chipping, and cracking may occur in the mirror edge portion 708 by the contact of the leaf spring 702 with the mirror edge portion 708 during the movement of the leaf spring 702. Further, when the leaf spring 702 is attached in the predetermined position, the leaf spring 702 and the mirror edge portion 708 of the reflecting mirror 62 are still in contact with each other. In addition, in the structure of FIG. 9A, the following problem arises at the time of attaching the leaf spring. That is, when the leaf spring 702 is pressed downward as illustrated in FIGS. 9B and 9C so as to be inserted, the leaf spring 702 is pressed in a direction indicated by the arrow 711 in FIG. 9C due to the reaction force exerted by the first pressing portion 704 that presses the mirror reflection surface 706. Further, the leaf spring 702 is significantly inclined as illustrated in FIG. 9C by the engaging portion 703. As a result, the leaf spring 702 is brought into contact with the mirror edge portion 708. Therefore, in order to prevent the shaving, chipping, and cracking of the mirror edge portion 708, it is desired that the leaf spring 702 be prevented from being brought into contact with the mirror edge portion 708 in the process from the start to the end of attaching the leaf spring 702. It is further desired that the leaf spring 702 be prevented from being brought into contact with the mirror edge portion 708 in a state in which the attaching of the leaf spring 702 is finished and thus the leaf spring 702 is attached in the predetermined position. That is, it is desired that the leaf spring 702 be prevented from being brought into contact with the mirror edge portion 708 in the entire process.

SUMMARY OF THE INVENTION

The present invention has been made in view of the above-mentioned circumstances, and therefore provides a light scanning apparatus and an image forming apparatus which suppresses the occurrence of chipping and cracking of an optical member in the process from the start of attaching an elastic member until achieving a state in which the elastic member is attached in a predetermined position.

In order to solve the above-mentioned problems, according to an embodiment of the present invention, there is provided a light scanning apparatus, comprising: a light source configured to emit a light beam; a deflector configured to deflect the light beam to cause the light beam emitted from the light source to scan a photosensitive member; an optical member configured to guide the light beam deflected by the deflector to the photosensitive member; a housing containing the light source, the deflector, and the optical member, the housing including a housing engaging portion and a supporting portion configured to support the optical member; a leaf spring including a pressing portion and a leaf spring engaging portion, the pressing portion being configured to press the optical member supported by the supporting portion, the leaf spring engaging portion being configured to engage with the housing engaging portion, and the leaf spring being configured to urge the optical member toward the supporting portion by the pressing portion pressing the optical member in a first state in which the housing engaging portion and the leaf spring engaging portion are engaged with each other; and an abutment portion provided on an opposite side to the housing engaging portion across the optical member, the pressing portion abutting the abutment portion in a second state in which the housing engaging portion and the leaf spring engaging portion are not engaged with each other, wherein, in a process in which the housing engaging portion and the leaf spring engaging portion are moved from the second state to the first state, the pressing portion is moved from the abutment portion onto the optical member supported by the supporting portion.

According to an embodiment of the present invention, there is provided an image forming apparatus, comprising: a photosensitive member; the above-mentioned light scanning apparatus configured to emit a light beam to the photosensitive member to form an electrostatic latent image; a developing unit configured to develop the electrostatic latent image formed by the light scanning apparatus to form a toner image; and a transfer unit configured to transfer the toner image formed by the developing unit onto a recording medium.

Further features of the present invention will become apparent from the following description of exemplary embodiments with reference to the attached drawings.

BRIEF DESCRIPTION OF THE DRAWINGS

FIGS. 5A, 5B, 5C, 5D, and 5E are perspective views illustrating the process from the start to the end of attaching the leaf spring according to the embodiment.

FIGS. 6A, 6B, 6C, 6D, and 6E are perspective views illustrating the process from the start to the end of attaching the leaf spring according to the embodiment.

FIGS. 7A, 7B, 7C, 7D, and 7E are cross-sectional views illustrating the process from the start to the end of attaching the leaf spring according to the embodiment.

FIG. 9A is a perspective view illustrating a leaf spring of the related art attached in a predetermined position.

FIG. 9B is a perspective view illustrating the process of attaching the leaf spring of FIG. 9A.

FIG. 9C is a cross-sectional view illustrating the leaf spring of FIG. 9B.

DESCRIPTION OF THE EMBODIMENTS

The embodiments of the present invention will hereinafter be described in detail with reference to the accompanying drawings.

Structure of Image Forming Apparatus

Figure 1:
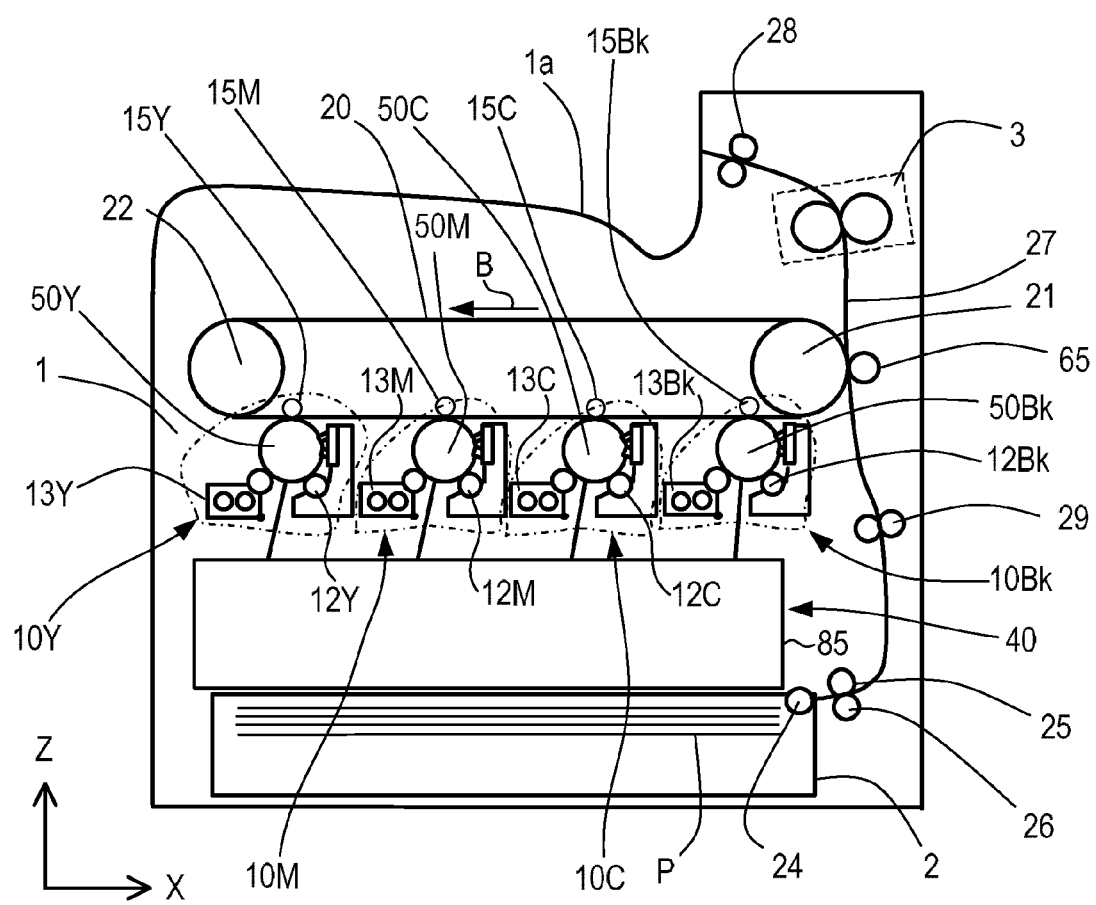
FIG. 1 is a cross-sectional view illustrating the structure of an image forming apparatus according to an embodiment.

The structure of an image forming apparatus according to the embodiment will be described. FIG. 1 is a cross-sectional view illustrating the entire structure of a tandem-type color laser beam printer according to the embodiment. The laser beam printer (hereinafter simply referred to as a printer) includes four image forming engines (image forming portions) 10Y, 10M, 10C, and 10Bk (indicated by the dashed lines) configured to form toner images of yellow (Y), magenta (M), cyan (C), and black (Bk), respectively. Further, the printer includes an intermediate transfer belt 20 onto which the toner image is transferred from each of the image forming engines 10Y, 10M, 10C, and 10Bk. The printer transfers the toner images transferred in multiple layers on the intermediate transfer belt 20 onto a recording sheet P as a recording medium to form a full color image. In the following description, symbols Y, M, C, and Bk representing respective colors are omitted unless otherwise stated.

The intermediate transfer belt 20 is formed into an endless belt, and is passed over a pair of belt conveyance rollers 21 and 22. While the intermediate transfer belt 20 is rotated in the direction indicated by the arrow B, the toner image formed by the image forming engine 10 of each color is transferred onto the intermediate transfer belt 20. Further, a secondary transfer roller 65 is arranged at a position opposite to the belt conveyance roller 21 across the intermediate transfer belt 20. The recording sheet P is inserted between the secondary transfer roller 65 and the intermediate transfer belt 20 which are in pressure contact with each other, and the toner image is transferred from the intermediate transfer belt 20 to the recording sheet P. The above-mentioned four image forming engines 10Y, 10M, 10C, and 10Bk are arranged side-by-side below the intermediate transfer belt 20. The image forming engines 10Y, 10M, 10C, and 10Bk transfer the toner images formed in accordance with respective color image information onto the intermediate transfer belt 20 (This operation is hereinafter referred to as a primary transfer.). The four image forming engines 10 are arranged along a rotation direction (the direction indicated by the arrow B) of the intermediate transfer belt 20 in the following order: the image forming engine 10Y for yellow; the image forming engine 10M for magenta; the image forming engine 10C for cyan; and the image forming engine 10Bk for black.

Further, a light scanning apparatus 40 is arranged below the image forming engines 10. The light scanning apparatus 40 exposes photosensitive drums 50 serving as photosensitive members provided in the image forming engines 10 with lights in accordance with the respective image information. Note that, in FIG. 1, detailed illustration and description of the light scanning apparatus 40 are omitted herein, and the light scanning apparatus 40 will be described later with reference to FIG. 2A. The light scanning apparatus 40 is shared by all of the image forming engines 10Y, 10M, 10C, and 10Bk, and includes four semiconductor lasers (not shown) serving as light sources configured to emit laser beams (hereinafter referred to as "light beams") modulated in accordance with the image information of the respective colors. Further, the light scanning apparatus 40 includes a rotary polygon mirror 42 serving as a deflector which rotates at a high speed to deflect the light beams of four optical paths to scan the photosensitive drums 50 along a rotation axis direction of the photosensitive drums 50, and a motor unit 41 configured to rotate the rotary polygon mirror 42. The light beams deflected by the rotary polygon mirror 42 is guided to the photosensitive drums 50 by the optical members provided in the light scanning apparatus 40, to irradiate the photosensitive drums 50.

Each image forming engine 10 includes the photosensitive drum 50, and a charging roller 12 configured to uniformly charge the photosensitive drum 50 to a background electric potential. Further, each image forming engine 10 includes a developing device (developing unit) 13 configured to develop an electrostatic latent image, which has been formed on the photosensitive drum 50 (on the photosensitive member) by exposing the photosensitive drum with the light beam, to form the toner image. The developing device 13 forms the toner image in accordance with the image information of the corresponding color on the photosensitive drum 50.

A primary transfer roller (transfer unit) 15 is arranged at a position opposite to the photosensitive drum 50 of each image forming engine 10 across the intermediate transfer belt 20. A predetermined transfer voltage is applied to the primary transfer roller 15, and thus the toner image on the photosensitive drum 50 is transferred onto the intermediate transfer belt 20.

Meanwhile, the recording sheet P is fed from a feed cassette 2 mounted in a lower portion of a printer main body 1 to an inside of the printer main body 1, specifically, to a secondary transfer position in which the intermediate transfer belt 20 and the secondary transfer roller (transfer unit) 65 are in contact with each other. A feed roller 25 and a pick-up roller 24 configured to pick up the recording sheet P contained in the feed cassette 2 are arranged side-by-side at an upper portion of the feed cassette 2. Further, a retard roller 26 configured to prevent a double feed of the recording sheets P is arranged in a position opposite to the feed roller 25. A conveyance path 27 for the recording sheet P in an inside of the printer main body 1 is provided substantially vertically along a right side surface of the printer main body 1. The recording sheet P, which has been picked up from the feed cassette 2 positioned at a bottom portion of the printer main body 1, is conveyed upward through the conveyance path to registration rollers 29 which control timing of causing the recording sheet P to enter the secondary transfer position. Then, after the toner image is transferred on the recording sheet P at the secondary transfer position, the recording sheet P is fed to a fixing device 3 (illustrated by the broken line) provided on a downstream side in a conveyance direction. The recording sheet P on which the toner image is fixed by the fixing device 3 is delivered via delivery rollers 28 onto a delivery tray 1a provided on an upper portion of the printer main body 1.

When the color laser beam printer constructed as described above forms a full-color image, the light scanning apparatus 40 first exposes the photosensitive drum of each image forming engine 10 with light at a predetermined timing in accordance with image information of each color. Thus, a latent image in accordance with the image information is formed on the photosensitive drum 50 of each image forming engine 10. In order to attain excellent image quality, the latent image formed by the light scanning apparatus 40 needs to be accurately reproduced at a predetermined position on the photosensitive drum 50, and the light intensity of the light beam for forming the latent image is always required to have a desired constant value stably.

Structure of Light Scanning Apparatus

Figure 2A:
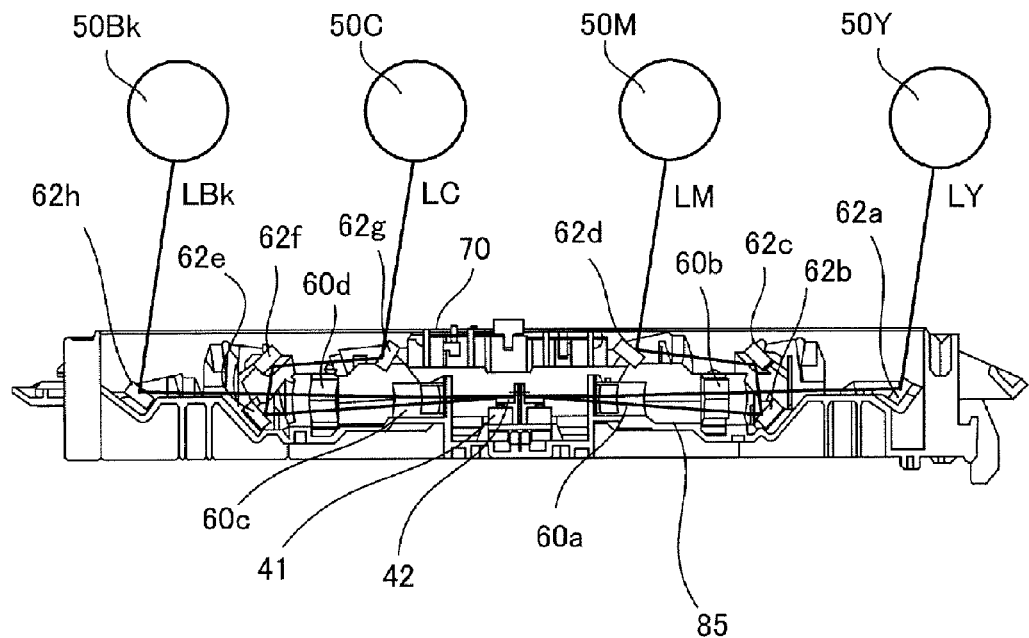
FIG. 2A is a cross-sectional view illustrating the structure of a light scanning apparatus according to the embodiment.

FIG. 2A is a schematic view illustrating an overview of attaching of optical components. A light beam LY, which is emitted from a light source unit 55 (refer to FIG. 2B) to correspond to the photosensitive drum 50Y, is deflected by a rotary polygon mirror 42 and enters an optical lens 60a. The light beam LY passes through the optical lens 60a, and enters an optical lens 60b. After passing through the optical lens 60b, the light beam LY is reflected by a reflecting mirror 62a. The light beam LY reflected by the reflecting mirror 62a passes through a transparent window (not shown), and scans the photosensitive drum 50Y. The rotary polygon mirror 42, the optical lens 60a, and the reflecting mirror 62a are contained in a housing 85. The light source unit 55 is disposed to the housing 85. The light source unit 55 may be contained in the housing 85.

A light beam LM, which is emitted from the light source unit 55 to correspond to the photosensitive drum 50M, is deflected by the rotary polygon mirror 42 and enters the optical lens 60a. The light beam LM passes through the optical lens 60a, and enters the optical lens 60b. After passing through the optical lens 60b, the light beam LM is reflected by a reflecting mirror 62b, a reflecting mirror 62c, and a reflecting mirror 62d. The light beam LM reflected by the reflecting mirror 62d passes through the transparent window (not shown), and scans the photosensitive drum 50M. The reflecting mirror 62b, the reflecting mirror 62c, and the reflecting mirror 62d are contained in the housing 85.

A light beam LC, which is emitted from the light source unit 55 to correspond to the photosensitive drum 50C, is deflected by the rotary polygon mirror 42 and enters the optical lens 60c. The light beam LC passes through the optical lens 60c, and enters the optical lens 60d. After passing through the optical lens 60d, the light beam LC is reflected by a reflecting mirror 62e, a reflecting mirror 62f, and a reflecting mirror 62g. The light beam LC reflected by the reflecting mirror 62g passes through the transparent window (not shown), and scans the photosensitive drum 50C. The optical lens 60c, the optical lens 60d, the reflecting mirror 62e, the reflecting mirror 62f, and the reflecting mirror 62g are contained in the housing 85.

A light beam LBk, which is emitted from the light source unit 55 to correspond to the photosensitive drum 50Bk, is deflected by the rotary polygon mirror 42 and enters the optical lens 60c. The light beam Bk passes through the optical lens 60c, and enters the optical lens 60d. After passing through the optical lens 60d, the light beam LBk is reflected by a reflecting mirror 62h. The light beam LBk reflected by the reflecting mirror 62h passes through the transparent window (not shown), and scans the photosensitive drum 50Bk. The reflecting mirror 62h is contained in the housing 85.

Figure 2B:
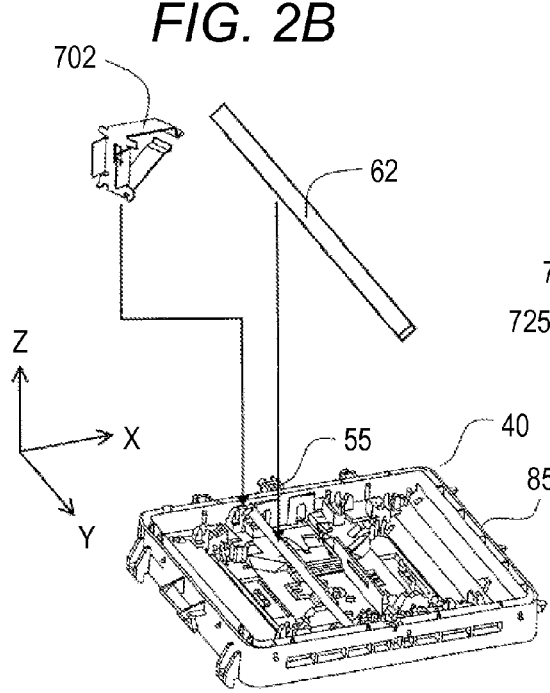
FIG. 2B is a perspective view illustrating arrangement of a reflecting mirror and a leaf spring in a housing.

FIG. 2B is a schematic perspective view illustrating arrangement of the reflecting mirror 62 configured to guide the light beam and a leaf spring 702 serving as a fixing member configured to fix the reflecting mirror 62 in the housing 85 of the light scanning apparatus 40. FIG. 2B illustrates the light scanning apparatus 40 in a state in which a top cover 70 is removed from the housing made of resin. In the following description, a direction of a rotational axis of the rotary polygon mirror 42 is referred to as a Z-axis direction, a main scanning direction being a scanning direction of the light beam or a longitudinal direction of the reflecting mirror 62 is referred to as a Y-axis direction, and a direction perpendicular to the Y-axis and the Z-axis is referred to as an X-axis direction.

Structure of Leaf Spring

Figure 2C:
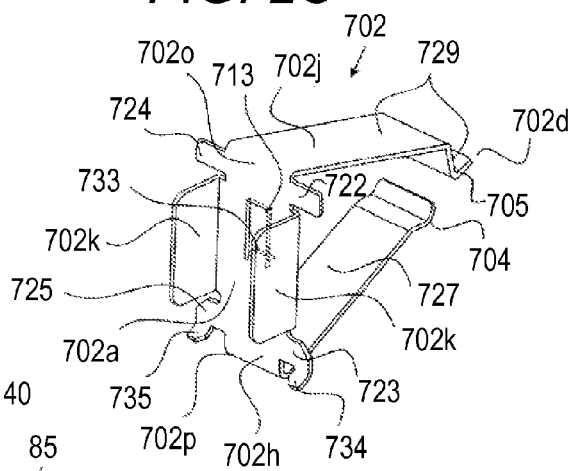
FIG. 2C is a perspective view illustrating the structure of the leaf spring.

The leaf spring 702 serving as an elastic member illustrated in FIG. 2C is formed by bending a single metal thin plate. The leaf spring 702 includes a first plate portion 702h serving as a plate portion having a reference surface 702a, and includes a second plate portion 727 serving as a second arm portion, a third plate portion 702j serving as a first arm portion, and a pair of fourth plate portions 702k. The first arm portion 702j, the second arm portion 727, and the pair of fourth plate portions 702k are bent from the first plate portion 702h.

The first plate portion 702h is a contact portion to be brought into contact with a projecting portion 633 (refer to FIG. 3 to be described later) serving as a second supporting portion described later, to receive a reaction force from the projecting portion 633. The first plate portion 702h and the second plate portion 727 are connected by a bending portion 702p. The bending portion 702p is formed by folding, from one end of the first plate portion 702h, the second plate portion 727 with respect to the first plate portion 702h into a substantially V-shape. When the bending portion 702p is elastically deformed, the relative positional relationship (relative angle) between the first plate portion 702h and the second plate portion 727 is changed. On the side of a surface opposite to the reference surface 702a, the second plate portion 727 extends toward the other end of the first plate portion 702h. The first plate portion 702h and the third plate portion 702j are connected by a bending portion 702o. The bending portion 702o is formed by bending the third plate portion 702j with respect to the first plate portion 702h at a substantially right angle. When the bending portion 702o is elastically deformed, the relative positional relationship (angle) between the first plate portion 702h and the third plate portion 702j is changed. The pair of fourth plate portions 702k is bent at a substantially right angle from both side ends of the first plate portion 702h to extend away from the second plate portion 727 and the third plate portion 702j.

The reference surface 702a is one surface of the first plate portion 702h having a thin plate shape, and is configured to abut on a spring bearing surface 736 of a rectangular column portion 633a of the projecting portion 633 provided in the housing 85, to serve as a reference for the position of the leaf spring 702 (FIGS. 3, 4A, 4B, and 4C). A first pressing portion 704 configured to press the reflecting mirror 62 is formed on the second plate portion 727. The first pressing portion 704 is bent into a protruded shape so as to protrude away from the first plate portion 702h at a distal end portion of the second plate portion 727. When the second plate portion 727 and the first plate portion 702h of the leaf spring 702 are inserted between the reflecting mirror 62 and the projecting portion 633 in a state of being deflected (compressed) against the elastic force, the first pressing portion 704 abuts on a mirror reflection surface 706 (refer to FIG. 3) of the reflecting mirror 62. In this case, the mirror reflection surface 706 of the reflecting mirror 62 is a surface which the light beam enters. Thus, the first pressing portion 704 presses the reflecting mirror 62 toward a first mirror seating surface 707 serving as a second contact portion of a mirror supporting portion 631 serving as a first supporting portion described later. Note that, the first mirror seating surface 707 is in contact with a second surface of the reflecting mirror 62, which is parallel to the mirror reflection surface 706.

A second pressing portion 705 configured to press the reflecting mirror 62 is formed on the third plate portion 702j. The second pressing portion 705 serving as a pressing portion is a portion having a dogleg shape, which is formed by bending a distal end portion 702d of the third plate portion 702j at an obtuse angle in a direction toward the second plate portion 727 and further bending the distal end portion 702d at a substantially right angle in a direction away from the second plate portion 727. Note that, a part of the third plate portion 702j, a part of the third plate portion 702j which is bent at the obtuse angle, and a part of the second pressing portion 705 constitute a second pressing arm 729. The second pressing portion 705 is configured to abut on a mirror flat surface 710 (refer to FIG. 3) which is a predetermined surface of the reflecting mirror 62. The leaf spring 702 is locked at the projecting portion 633 in a state in which the third plate portion 702j of the leaf spring 702 is deflected against the elastic force with respect to the first plate portion 702h. Thus, the second pressing portion 705 elastically presses the reflecting mirror 62 against a second mirror seating surface 709 serving as a first contact portion of the mirror supporting portion 631 serving as the supporting portion (refer to FIG. 3). Note that, the second mirror seating surface 709 is in contact with a first surface of the reflecting mirror 62, which is parallel to the mirror flat surface 710 (surface opposite to a first surface).

A hole portion 713 is an opening formed in the reference surface 702a through both the front and back surfaces of the first plate portion 702h. An engaging portion 733 (leaf spring-side engaging portion formed on the leaf spring; hereinafter referred to as "leaf spring engaging portion") engageable with an engaging portion 703 (housing-side engaging portion formed on the housing; hereinafter referred to as "housing engaging portion") of the projecting portion 633 is formed in the hole portion 713 by a part of the first plate portion 702h in which the hole portion 713 is provided. At positions between the bending portion 702o at which the first plate portion 702h is folded to the third plate portion 702j and the pair of fourth plate portions 702k, the first plate portion 702h includes protruding flat surface portions 722 and 724 which protrude toward both sides. Further, at positions between the bending portion 702p at which the first plate portion 702h is folded to the second plate portion 727 and the pair of fourth plate portions 702k, the first plate portion 702h includes protruding flat surface portions 723 and 725 which protrude toward both sides. The distal end portions of the protruding flat surface portions 723 and 725 are bent away from the second plate portion 727 to form stoppers 734 and 735, respectively. The stoppers 734 and 735 are configured to abut on surfaces 633b of the projecting portion 633. Thus, even when the pressing of the leaf spring 702 against guide surfaces by jigs described later is not released for some reason, the lowering of the leaf spring 702 can be stopped.

As described above, the leaf spring 702 is configured so that the engaging portion 733 formed in the leaf spring 702 itself is engaged with the engaging portion 703 formed in the housing 85. Thus, the leaf spring 702 does not drop off from the housing 85 by the reaction force from the reflecting mirror 62 so that the leaf spring 702 maintains the posture of the leaf spring 702. Note that, though FIG. 2C shows the reference symbols denoting the above-mentioned portions of the leaf spring 702, the reference symbols may be omitted in the other figures for the sake of securing viewability.

Structures of Spring Support Member and Mirror Support Member

Figure 3:
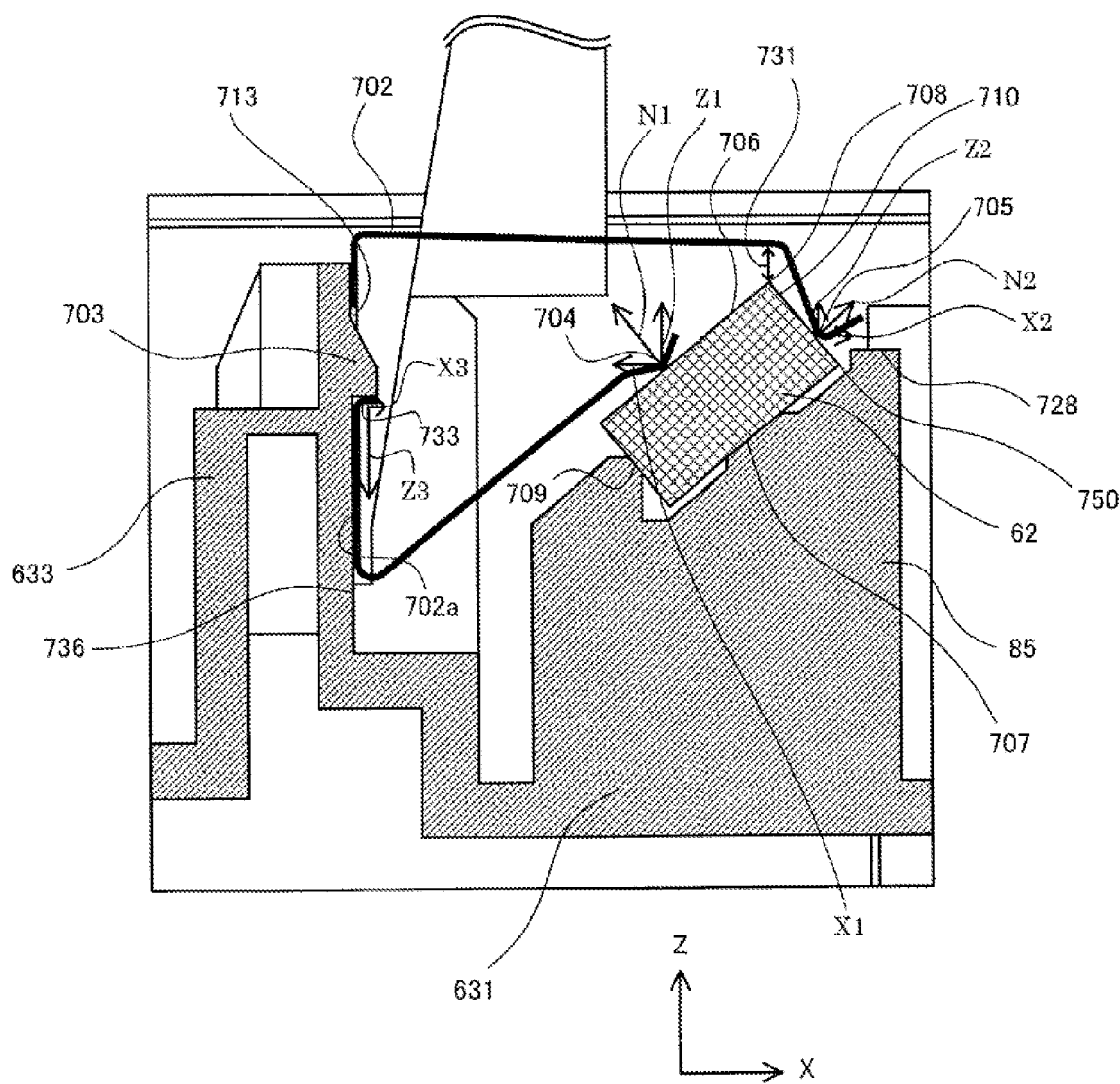
FIG. 3 is a cross-sectional view illustrating the structure in which the leaf spring according to the embodiment is attached in a predetermined position.

As illustrated in FIG. 3, the projecting portion 633 configured to support the leaf spring 702 and the mirror supporting portion 631 configured to support the reflecting mirror 62 to accurately attach the reflecting mirror 62 to the housing 85 are integrally molded inside the housing 85. The projecting portion 633 includes the rectangular column portion 633a (refer to FIG. 4A). The projecting portion 633 including the rectangular column portion 633a and the mirror supporting portion 631 are provided on the bottom portion of the housing 85 so that the projecting portion 633 and the mirror supporting portion 631 are at least partially opposed to each other in the longitudinal direction of the reflecting mirror 62. The projecting portion 633 including the rectangular column portion 633a is a gap forming portion configured to form a gap between the projecting portion 633 and the reflecting mirror 62 supported on the mirror supporting portion 631 described later. The rectangular column portion 633a is formed in the housing 85 so that the width of the rectangular column portion 633a in the Y-axis direction is slightly smaller than the distance between the pair of fourth plate portions 702k. The rectangular column portion 633a is inserted between the pair of fourth plate portions 702k when the leaf spring 702 is to be inserted between the reflecting mirror 62 and the projecting portion 633 in a Z-axis direction from the plus direction to the minus direction. Thus, the rectangular column portion 633a performs a function of guiding the leaf spring 702. Further, the spring bearing surface 736 of the projecting portion 633 is brought into contact with the reference surface 702a of the leaf spring 702 when the leaf spring 702 is engaged with the engaging portion 703 of the housing 85.

The mirror supporting portion 631 has the first mirror seating surface 707 and the second mirror seating surface 709, on which the reflecting mirror 62 pressed by the first pressing portion 704 and the second pressing portion 705 of the leaf spring 702 is brought into abutment. The first mirror seating surface 707 supports the surface the reflecting mirror 62 opposite to the mirror reflection surface 706 at a point of the surface opposite to the pressed point at which the reflecting mirror 62 is pressed by the first pressing portion 704 of the leaf spring 702.

Further, as a characteristic structure of the embodiment, the mirror supporting portion 631 includes a protruding portion 728 serving as an abutment portion with which the second pressing portion 705 of the leaf spring 702 is brought into abutment in the process of attaching the leaf spring 702 in the housing 85 (the process in which the leaf spring 702 is moved from a second state to a first state). In a state in which the leaf spring 702 is attached to the housing 85 in a predetermined position as illustrated in FIG. 3, the second pressing portion 705 of the leaf spring 702 is not in abutment with the protruding portion 728. The process of attaching the leaf spring 702 in the housing 85 will be described later with reference to FIG. 4A and so on.

State in which Leaf Spring is Attached to Housing in Predetermined Position

FIG. 3 is a cross-sectional view, taken along a plane parallel to the XZ plane, passing through a center portion of the leaf spring 702 in the Y-axis direction (hereinafter referred to simply as "passing through the center portion of the leaf spring") in a state in which the reflecting mirror 62 is pressed by the leaf spring 702 to be attached to the housing 85. In the embodiment, the mirror reflection surface 706 of the reflecting mirror 62 is pressed toward the first mirror seating surface 707 of the housing 85 by the first pressing portion 704 of the leaf spring 702. Further, the mirror flat surface 710 of the reflecting mirror 62 is pressed toward the second mirror seating surface 709 of the housing 85 by the second pressing portion 705 of the leaf spring 702. At both ends of the reflecting mirror 62 in the longitudinal direction (Y-axis direction), the reflecting mirror 62 is thus pressed and fixed to the housing 85 by the leaf springs 702 so that the reflecting mirror 62 is positioned without a wobble.

Further, the leaf spring 702 is configured so that the engaging portion 703 (housing engaging portion) provided in the housing 85 is engaged with the hole portion 713 formed in the leaf spring 702. Note that, such a structure that the engaging portion 703 is engaged with the hole portion 713 is referred to as a snap-fit structure. With the snap-fit structure, the leaf spring 702 does not drop off from the housing 85 due to the reaction force from the reflecting mirror 62, and the leaf spring 702 maintains the posture as it stands.

In the state in which the engaging portion 733 of the leaf spring 702 is engaged with the engaging portion 703 of the housing 85 and the leaf spring 702 is attached to the housing 85, the reflecting mirror 62 is pressed by the leaf spring 702. When the reflecting mirror 62 is pressed by the leaf spring 702 attached to the housing 85, the reflecting mirror 62 is urged and fixed to the housing 85. In this state, the leaf spring 702 and a mirror edge portion 708 of the reflecting mirror 62 are not in contact with each other. In the state in which the leaf spring 702 is attached to the housing 85 in the predetermined position, a gap corresponding to a clearance 731 described later is formed between the leaf spring 702 and the mirror edge portion 708. Thus, in the structure of the embodiment, it is possible to solve the above-mentioned problem inherent in the related art, that is, to prevent the chipping and cracking of the mirror edge portion 708 due to the contact between the leaf spring 702 and the mirror edge portion 708. Therefore, even the reflecting mirror 62 made of a glass material which makes the mirror edge portion 708 brittle can be used as the optical component.

As illustrated in FIG. 3, the leaf spring 702 is fitted, in an elastically deformed state, into the gap formed between the projecting portion 633 and the reflecting mirror 62 placed on the mirror supporting portion 631. As illustrated in FIG. 3, the first pressing portion 704 receives a reaction force N1 from the reflecting mirror 62. The reaction force N1 is decomposed into a force Z1 acting on the leaf spring 702 in a +Z direction and a force X1 acting on the leaf spring 702 in a −X direction.

As illustrated in FIG. 3, the second pressing portion 705 receives a reaction force N2 from the reflecting mirror 62. The reaction force N2 is decomposed into a force Z2 acting on the leaf spring 702 in the +Z direction and a force X2 acting on the leaf spring 702 in a +X direction. The sum of the force X1 and the force X2 (−X1+X2) corresponds to a force for urging the leaf spring 702 toward the rectangular column portion 633a of the projecting portion 633. Further, the force Z2 acts on the second pressing portion 705 from the reflecting mirror 62 in the +Z direction. When the forces Z1 and Z2 act on the leaf spring 702, the leaf spring 702 is not separated away from the gap between the projecting portion 633 and the reflecting mirror 62. That is, the light scanning apparatus of the embodiment is configured so that the engaging portion 733 of the hole portion 713 formed in the leaf spring 702 is put on a lower surface 732 (refer to FIG. 7D) of the engaging portion 703 of the housing 85. When the engaging portion 733 of the leaf spring 702 abuts on the lower surface 732 of the engaging portion 703 of the housing 85, a force Z3 in the −Z-axis direction acts on the leaf spring 702 at the portion of the abutment. The force Z3 is balanced with the force Z1 and the force Z2. Further, when the reference surface 702a of the leaf spring 702 abuts on the rectangular column portion 633a of the projecting portion 633, a force X3 in the +X-axis direction acts on the leaf spring 702. The force X3 is balanced with the sum of the force X1 and the force X2 (−X1+X2). Further, in order to prevent the leaf spring 702 from being rotated by rotational moment in a counterclockwise direction of FIG. 3, which acts on the leaf spring 702 due to the forces Z1, Z2, and Z3, the stoppers 734 and 735 abut on surfaces of the projecting portion 633 to receive reaction forces in the +X-axis direction from the surfaces of the projecting portion 633. The same applies to the forces X1, X2, and X3. That is, the point of action of the sum of the force X1 and the force X2 (−X1+ X2) and the point of action of the force X3 are shifted from each other in the Z-axis direction, and hence rotational moment is generated in the counterclockwise direction of FIG. 3, but as described above, the stoppers 734 and 735 are configured to prevent the leaf spring 702 from being rotated by the rotational moment.

As described above, the leaf spring 702 is not separated away from the gap between the projecting portion 633 and the reflecting mirror 62. The leaf spring 702 is elastically deformed by being fitted into the gap between the projecting portion 633 and the reflecting mirror 62, and hence the reflecting mirror 62 receives forces from the leaf spring 702 (reaction forces to the forces N1 and N2), with the result that the reflecting mirror 62 is pressed toward the mirror supporting portion 631.

Process from Start to End of Attaching Leaf Spring

Next, the fact that the leaf spring 702 and the mirror edge portion 708 are not in contact with each other with the structure of the embodiment in the process from the start to the end of attaching the leaf spring 702 (hereinafter referred to as "at the time of attaching") will be described with reference to the drawings. Note that, in the embodiment described below, the process of attaching the leaf spring 702 will be described on the premise that mass-production jigs are used assuming an automatic machine, but the present invention is not limited thereto, and the same effect can be obtained also when the leaf spring 702 is, for example, attached manually.

Figure 4A:
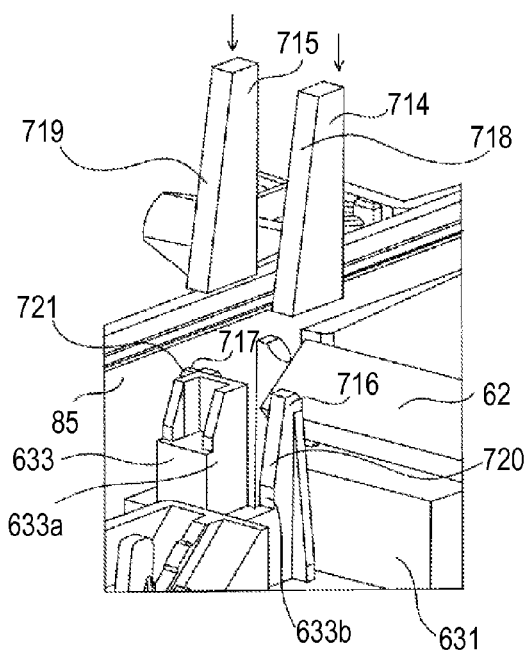
FIGS. 4A, 4B, and 4C are perspective views illustrating the process of attaching the leaf spring according to the embodiment.
Figure 4B:
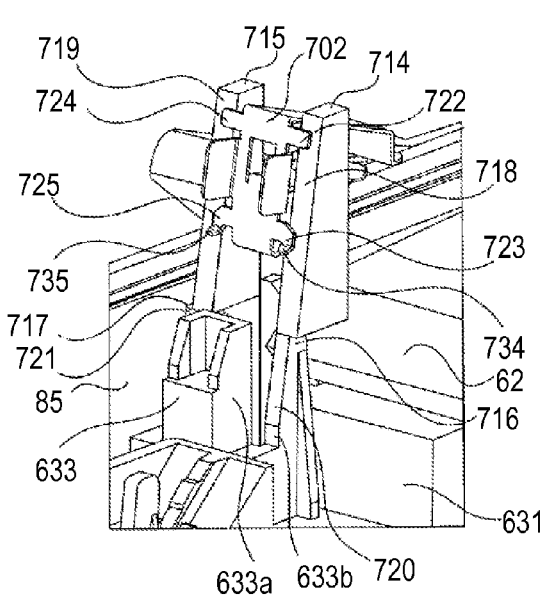
Figure 4C:
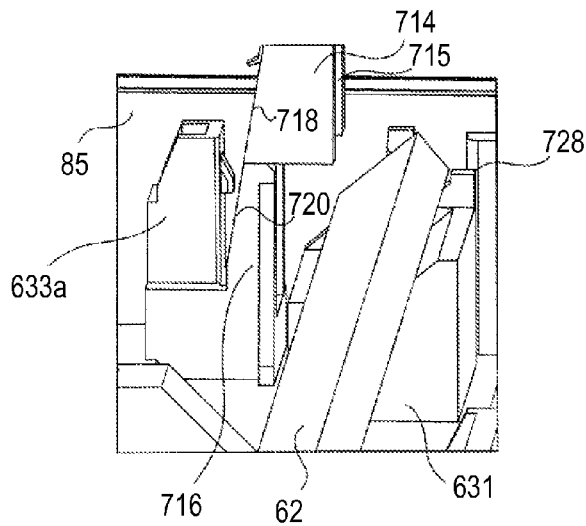
Figure 8A:
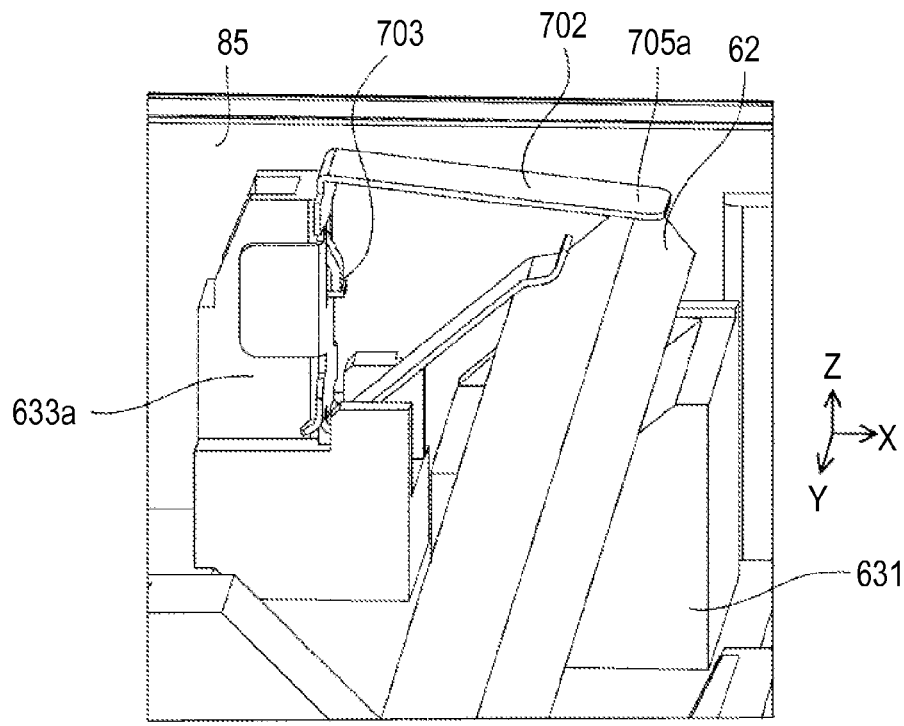
FIG. 8A is a perspective view illustrating an end portion of a reflecting mirror of the related art.
Figure 8B:
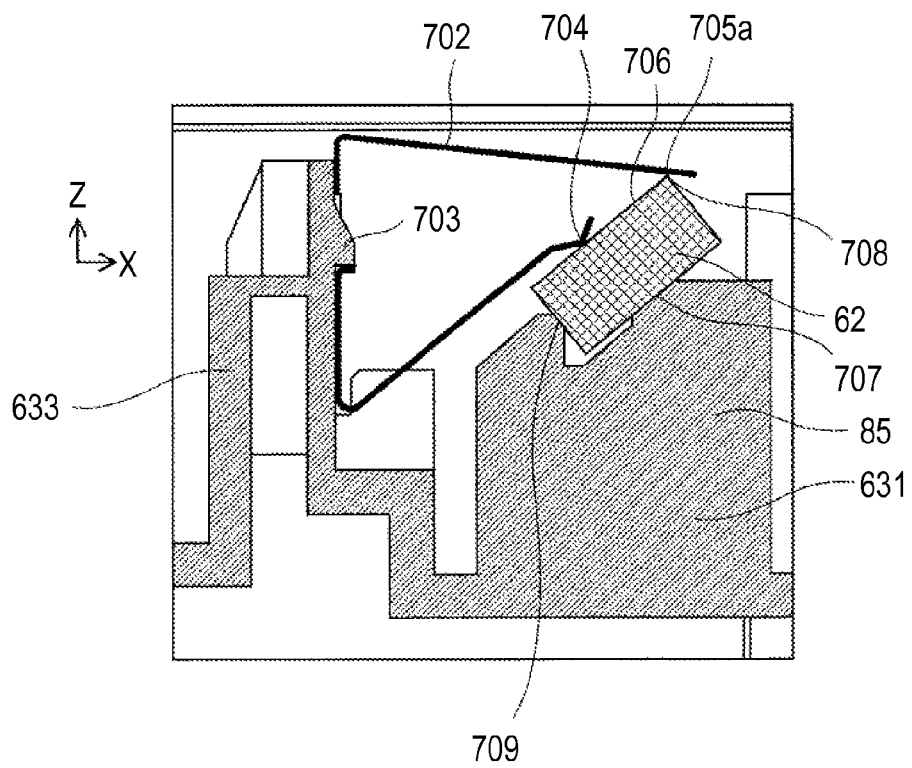
FIG. 8B is a cross-sectional view illustrating the reflecting mirror of FIG. 8A.

FIGS. 4A, 4B, and 4C illustrate a state in which the leaf spring 702 is attached at each of the both end portions of the reflecting mirror 62 in the longitudinal direction (Y-axis direction) in a state in which the reflecting mirror 62 is attached to the predetermined position of the mirror supporting portion 631 of the housing 85. Note that, FIGS. 4A, 4B, and 4C illustrate only one end portion of the both end portions of the reflecting mirror 62, and illustration and description of the other end portion (not shown) are omitted because the end portions have the same structure. The same applies hereinafter.

FIGS. 5A, 5B, 5C, 5D, and 5E are perspective views illustrating the process of attaching the leaf spring 702. FIGS. 6A, 6B, 6C, 6D, and 6E are perspective views illustrating the process of attaching the leaf spring 702. FIGS. 6A to 6E are perspective views illustrating the process of attaching the leaf spring 702 as viewed from an angle different from that of FIGS. 5A to 5E. FIGS. 7A, 7B, 7C, 7D, and 7E are cross-sectional views passing through the center portion of the leaf spring 702, for illustrating the process of attaching the leaf spring 702. FIGS. 7A to 7E illustrate a cross-section of the housing 85 in a hatched pattern. FIG. 5A, FIG. 6A, and FIG. 7A illustrate the same state, and the same applies to FIGS. 5B to 5E, FIGS. 6B to 6E, and FIGS. 7B to 7E, respectively.

As illustrated in FIG. 4A, prior to attachment of the leaf spring 702, attaching jigs 714 and 715 are moved from above the housing 85 and lowered in the direction indicated by the arrows in FIG. 4A. Each of the attaching jigs 714 and 715 is fixed to a jig main body (not shown).

FIG. 4B illustrates a state at the time when the attaching jigs 714 and 715 are further lowered in the state of FIG. 4A and positioned with respect to the housing 85. As illustrated in FIG. 4B, the attaching jigs 714 and 715 are brought into abutment with leaf spring posture regulating ribs 716 and 717 provided in the housing 85, respectively, and thus the lowering of the attaching jigs 714 and 715 is stopped. Further, the housing 85 and the jig main body (not shown) to which the attaching jigs 714 and 715 are fixed are positioned with high accuracy. Therefore, when the attaching jigs 714 and 715 are mounted at predetermined positions as illustrated in FIG. 4C, a slope 718 (719 on the far side in FIG. 4C) formed on the jig (jig side slope hereinafter referred to as "jig slope") and a slope 720 (721 on the far side in FIG. 4C) formed on the leaf spring posture regulating rib 716 (717 on the far side in FIG. 4C) of the housing (housing-side slope hereinafter referred to as "housing slope") forms a substantially straight line (are aligned with each other). The straight lines formed by the attaching jigs 714 and 715 and the housing 85 define, as illustrated in FIG. 4B, guide surfaces to be used when attaching the leaf spring 702. The sloping surfaces formed by the jig slopes 718 and 719 and the housing slopes 720 and 721 are hereinafter referred to as guide surfaces. The four protruding flat surface portions 722, 723, 724, and 725 formed on the leaf spring 702 are slid down from the jig slopes 718 and 719 toward the housing slopes 720 and 721 while being pressed toward the guide surfaces by the jigs (not shown).

FIG. 5A illustrates a state of the leaf spring 702 at the time when the leaf spring 702 is further lowered along the guide surfaces in the state of FIG. 4B. As understood from FIG. 7A, in this state, the first pressing portion 704 of the leaf spring 702 is brought into contact with the mirror reflection surface 706. At this time, the mirror edge portion 708 and the first pressing portion 704 are not in contact with each other, and thus the chipping and cracking of the mirror edge portion 708 do not occur. When the first pressing portion 704 is brought into contact with the mirror reflection surface 706 and the second plate portion 727 therefore starts to be folded, a pressing force starts to be exerted on the reflecting mirror 62 due to the deformation of the second plate portion 727. In the entire leaf spring 702, a reaction force to the pressing force exerted on the reflecting mirror 62 is generated in a direction indicated by the arrow 726 in FIG. 7A, but as described above, the leaf spring 702 is pressed toward the guide surfaces by the jigs (not shown). Therefore, the leaf spring 702 is not separated away from the jig slopes 718 and 719 and the housing slopes 720 and 721. Note that, in the states of FIG. 5A, FIG. 6A, and FIG. 7A, the first pressing portion 704 of the leaf spring 702 and the protruding portion 728 are not in contact with each other.

FIG. 5B illustrates a state of the leaf spring 702 at the time when the leaf spring 702 is further lowered along the guide surfaces from the state of FIG. 5A. FIG. 6B is a perspective view illustrating the state of FIG. 5B as viewed from a different angle. FIG. 7B is a cross-sectional view passing through the center portion of the leaf spring 702 in FIG. 5B. As understood from FIG. 7B, in this state, the first pressing portion 704 of the leaf spring 702 continues to press the mirror reflection surface 706, and the second pressing portion 705 starts to be brought into contact with the protruding portion 728 provided in the housing 85. Through the contact of the second pressing portion 705 with the protruding portion 728 and the further lowering of the leaf spring 702, the second pressing arm 729 presses the protruding portion 728, and is deformed so that the second pressing arm 729 is opened in a direction indicated by the arrow 730 in FIG. 7B due to a reaction force to the pressing force. That is, an angle formed at the bending portion between the third plate portion 702*j* and the second pressing portion 705 of the second pressing arm 729 is increased by the deformation of the second pressing arm 729.

FIG. 5C illustrates a state at the time when the second pressing arm 729 is deformed. FIG. 6C is a perspective view illustrating the state of FIG. 5C as viewed from a different angle. FIG. 7C is a cross-sectional view passing through the center portion of the leaf spring 702. As understood from FIG. 7C, the second pressing portion 705 of the leaf spring 702 presses the protruding portion 728. Thus, by the deformation due to a reaction force from the protruding portion 728, that is, from the housing 85, the gap (hereinafter referred to as the "clearance 731") is formed between the leaf spring 702 and the mirror edge portion 708. With the clearance 731 formed between the leaf spring 702 and the mirror edge portion 708, the chipping and cracking of the mirror edge portion 708, which might otherwise be caused by the contact between the leaf spring 702 and the mirror edge portion 708, can be prevented. If the protruding portion 728 is not formed in the housing 85 as in the related art illustrated in FIG. 9C, the second pressing arm 729 is not deformed so that the second pressing arm 729 is not opened as good as illustrated in FIG. 7C. For that reason, the clearance 731 is not formed unlike the embodiment, with the result that the chipping and cracking occur in the mirror edge portion 708.

FIG. 5D illustrates a state of the leaf spring 702 at the time when the leaf spring 702 is further lowered along the guide surfaces from the state of FIG. 5C. FIG. 6D is a perspective view illustrating the state of FIG. 5D as viewed from a different angle. FIG. 7D is a cross-sectional view passing through the center portion of the leaf spring 702. As understood from FIG. 7D, the engaging portion 733 of the hole portion 713 formed in the leaf spring 702 is positioned below the lower surface 732 of the engaging portion 703 of the housing 85 in the Z-axis direction in FIG. 7D. Thus, when the pressing of the leaf spring 702 against the guide surfaces, formed by the jig slopes 718 and 719 and the housing slopes 720 and 721, by the jigs (not shown) is released, the leaf spring 702 is moved leftward in the X-axis direction in FIG. 7D due to the reaction force to the pressing force for urging the reflecting mirror 62. Then, the engaging portion 703 of the housing 85 and the hole portion 713 of the leaf spring 702 are engaged with each other, and thus the leaf spring 702 is engaged with the housing 85 with the snap-fit structure.

Note that, in the state of FIG. 5D, the clearance 731 between the second pressing arm 729 and the mirror edge portion 708 becomes smallest, and hence the leaf spring 702 and the mirror edge portion 708 become closest to each other. According to the structure of the embodiment, however, the leaf spring 702 and the mirror edge portion 708 are not in contact with each other, and hence the chipping and cracking of the mirror edge portion 708 of the reflecting mirror 62 do not occur. If the jigs (not shown) cannot release the pressing of the leaf spring 702 against the guide surfaces for some reason and therefore the leaf spring 702 is further lowered toward the housing 85, the stoppers 734 and 735 of the leaf spring 702 described with reference to FIG. 2C are brought into abutment with the housing 85. In the embodiment, the dimensions are designed so that the clearance 731 between the leaf spring 702 and the mirror edge portion 708 may be secured even in the above-described situation, and hence the leaf spring 702 is not brought into contact with the mirror edge portion 708.

FIG. 5E illustrates a state at the time when the housing 85 and the leaf spring 702 are engaged with each other with the snap-fit structure in accordance with the steps described above. FIG. 6E is a perspective view illustrating the state of FIG. 5E as viewed from a different angle. FIG. 7E (corresponding to FIG. 3) is a cross-sectional view passing through the center portion of the leaf spring 702. As described above, the leaf spring 702 illustrated in FIG. 7E (FIG. 3) is pressed against the spring bearing surface 736 of the housing 85 due to the reaction force from the reflecting mirror 62. Thus, the leaf spring 702 is moved leftward in the X-axis direction of FIG. 7D to move from the state in FIG. 7D to the state in FIG. 7E (FIG. 3). In the process of this movement, where the second pressing portion 705 of the leaf spring 702 presses is changed from the protruding portion 728 in the housing 85 to the mirror flat surface 710. Accordingly, in the embodiment, where the leaf spring 702 abuts is changed from the protruding portion 728 to the reflecting mirror 62 (optical member) when the attaching of the leaf spring 702 in the housing 85 is completed. In the process of moving the leaf spring 702 from the position in FIG. 7D to the position in FIG. 7E, the clearance 731 between the leaf spring 702 and the mirror edge portion 708 is expanded, and thus the leaf spring 702 is not brought into contact with the mirror edge portion 708. Thus, also in this process, the chipping and cracking of the reflecting mirror 62 do not occur.

Note that, in order to facilitate the movement of the second pressing portion 705 from the protruding portion 728, the flat surface on the protruding portion 728 (abutment portion) may be changed to a sloping surface (tapered-shape) or a surface with chamfered edge. Specifically, the protruding portion 728 is constructed to have a sloping surface gradually lower in height toward the reflecting mirror 62 so that, in the process of engaging the engaging portion 703 with the engaging portion 733, the second pressing portion 705 may move along the sloping surface. Further, the width of the protruding portion 728 in the scanning direction of the light beam is smaller than the width of the second pressing portion 705 in the scanning direction. Still further, in the embodiment, the height of the protruding portion 728 of the housing 85 (level in the Z-axis direction) is set so as to regulate the position of the reflecting mirror 62 when the reflecting mirror 62 is moved to the flat surface of the second mirror seating surface 709. That is, the height of the protruding portion 728 is larger than the height of a corner portion 750 (refer to FIG. 3) formed by the mirror flat surface 710 of the reflecting mirror 62 and the surface, which abuts on the first mirror seating surface 707, of the reflecting mirror 62. Thus, it is possible to prevent the reflecting mirror 62 from dropping off from the flat surface of the second mirror seating surface 709 when any impacts due to falling or vibration are applied to the entire light scanning apparatus 40.

The series of operations from the start to the end of attaching the leaf spring 702 to the housing 85 according to the embodiment has been described above. In any process, the leaf spring 702 and the mirror edge portion 708 are not in contact with each other. Therefore, the chipping and cracking do not occur in the mirror edge portion 708.

Note that, in the embodiment, there has been described the case of fixing of the reflecting mirror 62 as an example of the optical component to the housing 85 by the leaf spring 702, but the embodiment is not limited to the reflecting mirror 62.

Therefore, the above-mentioned structure is also applicable to a case of fixing of an optical component such as a lens made of glass, which is prone to the chipping and cracking due to the contact with the leaf spring 702 when the optical component is pressed by the leaf spring 702. Further, in the embodiment, the light scanning apparatus mounted in the image forming apparatus has been described as an example, but the embodiment is not limited thereto. For example, the structure of the embodiment is also applicable to a case of fixing an optical component to be used in an image reading apparatus mounted in the image forming apparatus.

As described above, according to the embodiment, it is possible to suppress the chipping and cracking of the optical member in the process from the start of attaching the elastic member until achieving the state in which the elastic member is attached in the predetermined position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134042, filed Jun. 26, 2013, which is hereby incorporated by reference herein in its entirety.

What is claimed is:

1. A light scanning apparatus, comprising:
   a light source configured to emit a light beam;
   a deflector configured to deflect the light beam to cause the light beam emitted from the light source to scan a photosensitive member;
   an optical member configured to guide the light beam deflected by the deflector to the photosensitive member;
   a housing containing the deflector and the optical member, the housing including a housing engaging portion and a supporting portion configured to support the optical member;
   a leaf spring including a pressing portion and a leaf spring engaging portion, the pressing portion being configured to press the optical member supported by the supporting portion, the leaf spring engaging portion being configured to engage with the housing engaging portion; and
   an abutment portion provided on an opposite side to the housing engaging portion across the optical member,
   wherein in a first state in which the housing engaging portion and the leaf spring engaging portion are engaged with each other, the pressing portion presses the optical member supported by the supporting portion and the leaf spring is not in contact with the abutment portion, and wherein in a second state in which the housing engaging portion and the leaf spring engaging portion are not engaged with each other, the optical box and the leaf spring are configured so that the pressing portion and the abutment portion are in contact with each other, and
   wherein, in association with a movement of the leaf spring to move the housing engaging portion and the leaf spring engaging portion from the second state to the first state, the pressing portion is moved from the abutment portion onto the optical member supported by the supporting portion.

2. A light scanning apparatus according to claim 1, wherein a width of the abutment portion in a scanning direction of the light beam is smaller than a width of the pressing portion in the scanning direction.

3. A light scanning apparatus according to claim 1, wherein the optical member comprises a reflecting mirror made of glass, the reflecting mirror being configured to reflect the light beam.

4. A light scanning apparatus according to claim 3, wherein the housing is made of resin.

5. A light scanning apparatus according to claim 1, wherein the supporting portion comprises:
   a first contact portion configured to contact a first surface of the optical member; and
   a second contact portion configured to contact a second surface of the optical member, wherein the supporting portion is configured to support the optical member by the first contact portion and the second contact portion,
   wherein the leaf spring further comprises:
   a plate portion provided with the leaf spring engaging portion;
   a first arm portion provided with the pressing portion, the first arm portion being bent from the plate portion at one end of the plate portion; and
   a second arm portion provided with a second pressing portion other than the said pressing portion, the second arm portion being bent from the plate portion at another end of the plate portion, and
   wherein the pressing portion and the second pressing portion presses the optical member to urge the optical member toward the first contact portion and the second contact portion.

6. A light scanning apparatus according to claim 5, wherein the pressing portion provided on the first arm portion presses a surface opposite to the first surface of the optical member to urge the optical member toward the first contact portion, and
   wherein the second pressing portion provided on the second arm portion presses a surface opposite to the second surface of the optical member to urge the optical member toward the second contact portion.

7. A light scanning apparatus according to claim 5, wherein a gap is formed between the housing engaging portion and the optical member supported by the supporting portion, and
   wherein the leaf spring is inserted into the gap to be elastically deformed so that the second pressing portion provided on the second arm portion presses the optical member.

8. A light scanning apparatus according to claim 1, wherein the abutment portion has a sloping surface gradually lower in height toward the optical member supported by the supporting portion, and
   wherein, in association with the movement of the leaf spring to move the housing engaging portion and the leaf spring engaging portion from the second state to the first state, the pressing portion is moved on the sloping surface.

9. An image forming apparatus, comprising:
   a photosensitive member;
   a light scanning apparatus, as recited in claim 1, configured to emit a light beam to the photosensitive member to form an electrostatic latent image thereon;
   a developing unit configured to develop the electrostatic latent image formed by the light scanning apparatus to form a toner image; and
   a transfer unit configured to transfer the toner image formed by the developing unit onto a recording medium.

* * * * *